US012561519B2

(12) United States Patent
    Iliadis

(10) Patent No.:    US 12,561,519 B2
(45) Date of Patent:        Feb. 24, 2026

(54) SCALABLE FORM MATCHING

(71) Applicant: DST Technologies, Inc., Kansas City, MO (US)

(72) Inventor: Michail Iliadis, Oakland, CA (US)

(73) Assignee: DST Technologies, Inc., Kansas City, MO (US)

( * ) Notice:    Subject to any disclaimer, the term of this patent is extended or adjusted under 35 U.S.C. 154(b) by 1008 days.

(21) Appl. No.: 16/685,724

(22) Filed:    Nov. 15, 2019

(65)            Prior Publication Data

US 2021/0149931 A1      May 20, 2021

(51) Int. Cl.
    G06F 40/186        (2020.01)
    G06F 16/23         (2019.01)
    G06F 16/31         (2019.01)
    G06F 16/334        (2025.01)
    G06F 16/93         (2019.01)
    (Continued)

(52) U.S. Cl.
    CPC ........ G06F 40/186 (2020.01); G06F 16/2365 (2019.01); G06F 16/313 (2019.01); G06F 16/3347 (2019.01); G06F 16/93 (2019.01); G06N 3/08 (2013.01); G06T 3/60 (2013.01); G06V 10/751 (2022.01); G06V 10/82 (2022.01); G06V 30/19173 (2022.01); G06V 30/412 (2022.01); G06V 30/418 (2022.01); G06T 2207/20081 (2013.01); G06T 2207/20084 (2013.01)

(58) Field of Classification Search
    CPC ............... G06F 16/313; G06F 16/3347; G06F 16/2365; G06F 16/93; G06F 40/186; G06N 3/08; G06T 3/60; G06T 2207/20084; G06T 2207/20081

USPC ......................................................... 707/749
    See application file for complete search history.

(56)                 References Cited

U.S. PATENT DOCUMENTS 5,274,714 A  *  12/1993  Hutcheson ............... G07C 9/25
                                                  382/157
    8,724,907 B1 *   5/2014  Sampson  ........... G06K 9/00483
                                                  382/218
                    (Continued)

OTHER PUBLICATIONS

Ye, Xiangyun, et al., "A generic method of cleaning and enhancing handwritten data from business forms", IJDAR (International Journal on Document Analysis and Recognition), vol. 4, Springer-Verlag, © 2001, pp. 84-96.*
                    (Continued)

*Primary Examiner* — Robert Stevens
(74) *Attorney, Agent, or Firm* — Perkins Coie LLP; Colin Fowler

(57)                 ABSTRACT

Disclosed are a method and apparatus for determining a given template of a form used by a filled in instance of that type of form from amongst a great number of form templates (a hundred or more). The given instance is evaluated by a neural network that has been trained by a single example of each template in order to reduce the total number of templates down to a manageable amount. Given a list of closest matching templates, the instance is aligned to each of the closest matching templates. The comparison generates a match score. The form template having the greatest match score is the correct form template. Filtering the instance through a one-shot learning neural network before performing a precise comparison enables the process to scale to any number of template forms.

12 Claims, 11 Drawing Sheets

(51) Int. Cl.

| | |
|---|---|
| *G06N 3/08* | (2023.01) |
| *G06T 3/60* | (2024.01) |
| *G06V 10/75* | (2022.01) |
| *G06V 10/82* | (2022.01) |
| *G06V 30/19* | (2022.01) |
| *G06V 30/412* | (2022.01) |
| *G06V 30/418* | (2022.01) |

(56) References Cited

U.S. PATENT DOCUMENTS

| | | | |
|---|---|---|---|
| 10,803,309 B2 * | 10/2020 | Sridharan | G06F 40/197 |
| 2016/0012317 A1 * | 1/2016 | Mayle | G06V 10/462 |
| | | | 382/159 |
| 2016/0148074 A1 * | 5/2016 | Jean | G06V 10/462 |
| | | | 382/190 |
| 2020/0074169 A1 * | 3/2020 | Mukhopadhyay | G06F 40/174 |
| 2020/0159820 A1 * | 5/2020 | Rodriguez | G06F 40/137 |

OTHER PUBLICATIONS

"Machine Learning", Wikipedia, downloaded from: https://en.wikipedia.org/wiki/Machine_learning on Dec. 30, 2021, pp. 1-19.*

Taylor, Suzanne Liebowitz, et al., "Extraction of Data from Preprinted Forms", Machine Vision and Applications, vol. 5, Jun. 1992, pp. 211-222.*

Garris, Michael D., et al., "Neural Network-Based Systems for Handprint OCR Application", IEEE Transactions on Image Processing, vol. 7, No. 8, Aug. 1998, pp. 1097-1112.*

Tseng, Lin Yu, et al., "Recognition and Data Extraction of Form Documents Based on Three Types of Line Segments", Pattern Recognition, vol. 31, No. 10, Oct. 1998, pp. 1525-1540.*

Wang, Monan, et al., "A Review of Deformation Models in Medical Image Registration", Journal of Medical and Biological Engineering, vol. 39, published Apr. 16, 2018, pp. 1-17.*

Doetsch, Fiona, et al., "Young and excitable: the function of new neurons in the adult mammalian brain", Current Opinion in Neurobiology, vol. 15, Issue 1, Feb. 2005, pp. 121-128.*

Microsoft Computer Dictionary, 5th Edition, Microsoft Press, Redmond, WA, © 2002, pp. 309 and 344.*

"Subset", Wikipedia, downloaded from: https://en.wikipedia.org/wiki/Subset on Jul. 25, 2024, pp. 1-4.*

* cited by examiner

Figure 2:
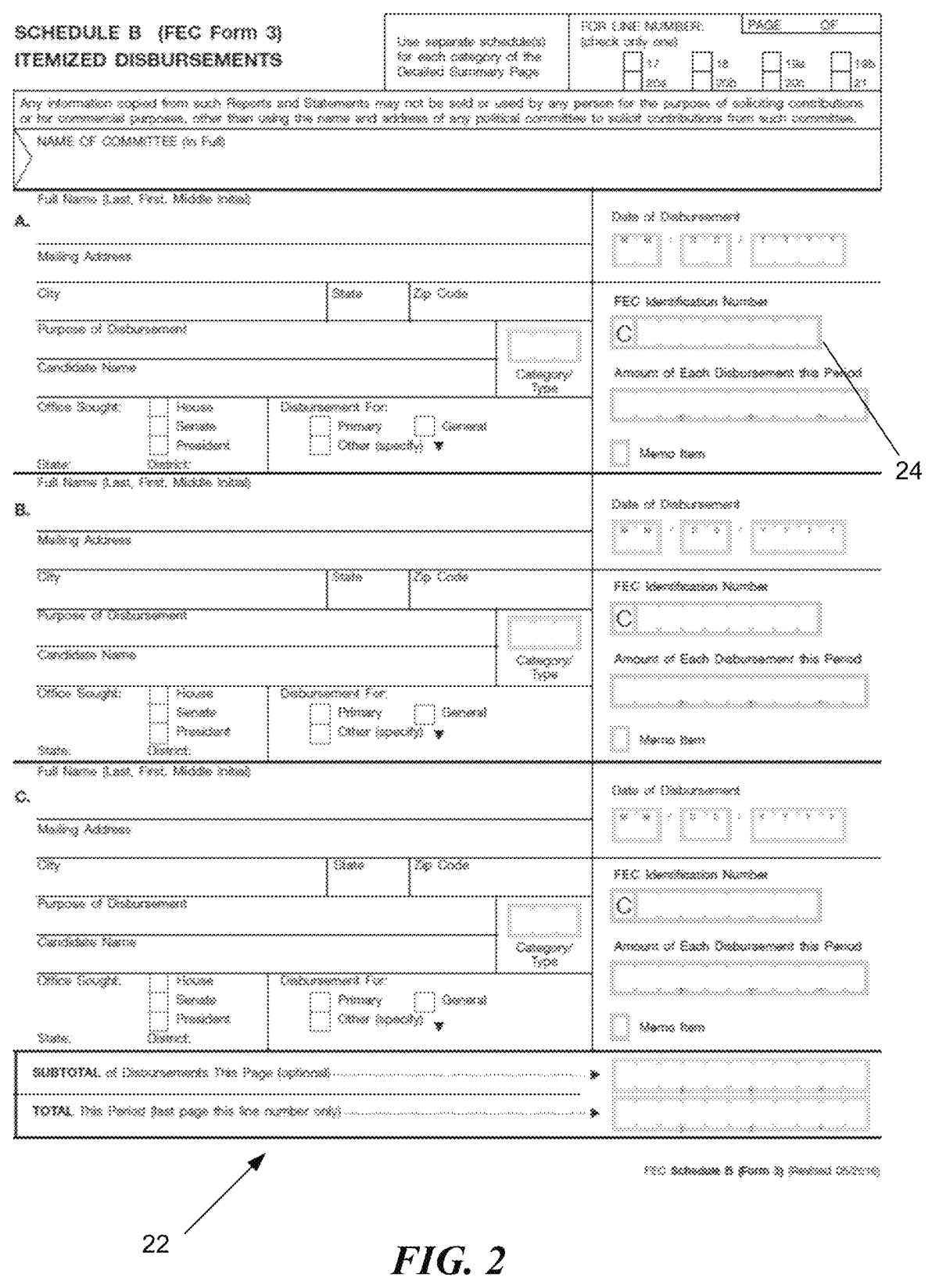

SCHEDULE B  (FEC Form 3)
ITEMIZED DISBURSEMENTS

Use separate schedule(s)
for each category of the
Detailed Summary Page

FOR LINE NUMBER:
(check only one)

PAGE ___ OF ___

Any information copied from such Reports and Statements may not be sold or used by any person for the purpose of soliciting contributions
or for commercial purposes, other than using the name and address of any political committee to solicit contributions from such committee.

NAME OF COMMITTEE (in Full)

Full Name (Last, First, Middle Initial)

A.

Mailing Address

| City | State | Zip Code |

Purpose of Disbursement

Candidate Name

Category/
Type

Office Sought:  House  Senate  President

Disbursement For:  Primary  General  Other (specify) ▼

State:  District:

Date of Disbursement

FEC Identification Number

C

Amount of Each Disbursement this Period

Memo Item

24

Full Name (Last, First, Middle Initial)

B.

Mailing Address

| City | State | Zip Code |

Purpose of Disbursement

Candidate Name

Category/
Type

Office Sought:  House  Senate  President

Disbursement For:  Primary  General  Other (specify) ▼

State:  District:

Date of Disbursement

FEC Identification Number

C

Amount of Each Disbursement this Period

Memo Item

Full Name (Last, First, Middle Initial)

C.

Mailing Address

| City | State | Zip Code |

Purpose of Disbursement

Candidate Name

Category/
Type

Office Sought:  House  Senate  President

Disbursement For:  Primary  General  Other (specify) ▼

State:  District:

Date of Disbursement

FEC Identification Number

C

Amount of Each Disbursement this Period

Memo Item

SUBTOTAL of Disbursements This Page (optional) ······················· ►

TOTAL This Period (last page this line number only) ······················· ►

FEC Schedule B (Form 3) Revised 02/2009

Correct Template 22              Wrong Template 26

START

Align instance with each templates
1002

Determine "bad" key points
1004

Generate grid patch around
keypoints
1006

Compare key points to instance
1008

Score each comparison
1010

Identify correct template based on
comparison scores
1012

END

SCALABLE FORM MATCHING

TECHNICAL FIELD

The disclosure relates to computer vision techniques and more particularly, to techniques to improve scalability of computer vision.

BACKGROUND

Filling out paper forms is a part of life. A trip to a doctor's office, to the department of motor vehicles (DMV), to an office of a potential new employer, etc., often involves filling out a paper form. Such forms have fields for people to provide information, such as a field for a person's name, another for his address, yet another for his phone number, etc. Some organizations have hundreds or thousands of forms that apply to various aspects of the organization's operations. While humans can readily identify forms from one another, the lack of intuitive reading in a computer causes issues when digitizing forms. Computers are able to identify differences in forms with a great deal of precision, but such operations are computationally expensive and scale poorly.

BRIEF DESCRIPTION OF THE DRAWINGS

One or more embodiments are illustrated by way of example in the figures of the accompanying drawings, in which like references indicate similar elements.

FIG. 1 is an instance of a filled in form.

FIG. 2 is the correct template that matches the filled in instance.

FIG. 4 is an incorrect template of a different version of the form of the filled in instance.

FIG. 6 is an illustration of a key point analysis grid from the incorrect template.

DETAILED DESCRIPTION

Figure 3:
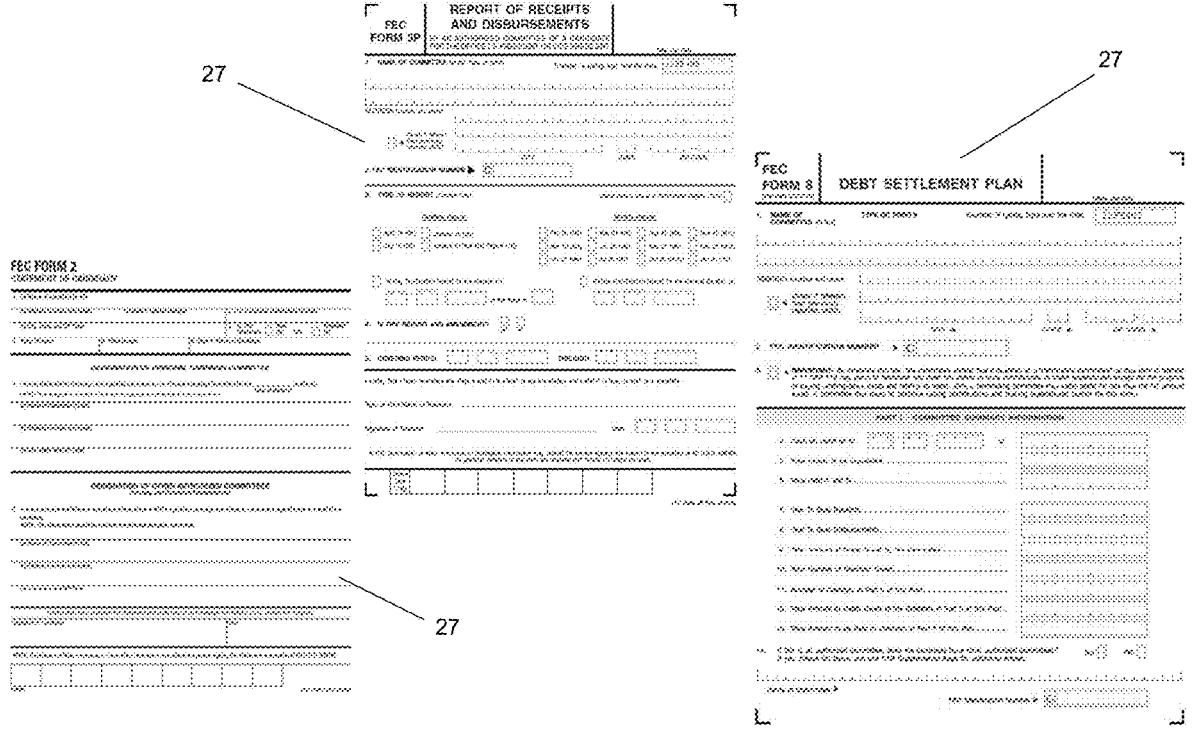
FIG. 3 is a sample of assorted form templates available from a single organization.

Introduced here is technology related to automatically categorizing a filled-out form into one of many available template forms a given organization has available. A form is a piece of material, such as a piece of paper, plastic, fabric, cardboard, etc., on which data/information/graphics/etc. that defines the form is printed, written, etc. For example, a form can be a piece of paper on which a recorded donation for the Federal Election Commission is printed, a client intake questionnaire for a doctor's office is printed, a piece of paper on which an information data sheet for the Department of Motor Vehicles (DMV) is printed, a piece of plastic for an overhead projector on which a teacher draws a table for gathering student preferences for a field trip, a cardboard box for a cereal on which a contest entry sheet is printed, etc.

The data/information/graphics/etc. that defines a form can be applied in any of various ways to the piece of material of the form, such as by being manually written on the material, by being printed on the material, etc. Forms may be digitized and stored as image data on a computer. Digitized forms may have started as digital forms, generated via a word processor or a document editor, or as a physical document that was later scanned and converted to image data.

A company, office, or other organization or group may have a number of different forms. That organization may have hundreds or thousands of forms. In order to automatically extract information from a particular form, such as extracting the name of a person from a filled in NAME field of a form, it may be helpful to identify a particular form template of which the particular form is an instance. In order to accomplish such an identification, it can be useful to generate a library of templates of the various different forms, and of versions of the various different form templates.

A template of a form, also referred to herein as a form template, is a version of a form that is used as a reference, such as for a comparison to an image of a selected form to determine whether the selected form is an instance of the form template, or is a different version of the form template, etc. A form template can be in any of various forms or formats from which an image of the form template can be generated. Additionally, a form template can be a source file from which an image of the form template can be generated by use of an application program that is compatible with the source file. Example formats include a BMP (Bitmap), a JPEG (Joint Photographic Expert Group) file, TIFF (Tagged Image File Format) file, Published Document Format (PDF), etc.

A challenge arises when attempting to identify a particular form template which corresponds to an instance of a filled in form. For example, a form can have a version that varies based a number of factors, such as type of organization of fields. In order to successfully digitize data across many use cases, accurate identification of a form template, and of the version of the form template, improves efficiency of digitizing data across versions of the form.

A complete pixel comparison between the instance and the form templates will not provide the desired results because the instance of the form includes pixels where handwriting or other user input was used to fill in the form. Thus, the instance of the form will vary notably with all form templates.

Introduced here is technology that, provided a large number of form templates (hundreds or thousands) and a filled in instance of a form (potentially many filled in instances that are actively being digitized), is able to identify which form template the instance matches. To identify the correct match, pixels between the instance and templates are compared.

In some embodiments, the given instance is aligned to each of the variants or form templates through a registration technique. The result of the alignment includes a series of key points that did not match up well ("bad" key points). The bad key points are taken from the form templates. The key points taken are distinct from bad key points from the instance. Then, a set of pixel patches from around each of the bad key points of the form templates are extracted/identified. The pixel patches are compared to corresponding pixel patches of the instance. The comparison generates a match score. The form template having the greatest match score is the correct form template. The above process is (and other embodiments of the precise template identification described below) just one efficient method of identifying a precise template that matches the instance. Other methods to identify a precise template may be used in place of the this described technique in conjunction with other components of the template identification process described herein.

Notably, while the above process (or other precise processes) delivers correct results, the processes are computationally expensive. When compared over many hundreds or thousands of template forms, the processing time is overly burdensome. A technique to reduce processing time is to reduce the "n" value (number of iteration or total operations) for the most expensive/gating operation. To reduce the n value, a less computationally complex pre-processing step is included. The pre-processing step utilizes one-shot neural networks to filter the hundreds or thousands of potential templates down to a more manageable number (e.g., 50 or fewer, 10 or fewer, etc.). The neural network is trained with a single example of each template. An example of a suitable neural network architecture is ResNet50. A pretrained version of the ResNet50 is available through MathWorks, though others are available online, and can be coded in any programming language.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Figure 1:
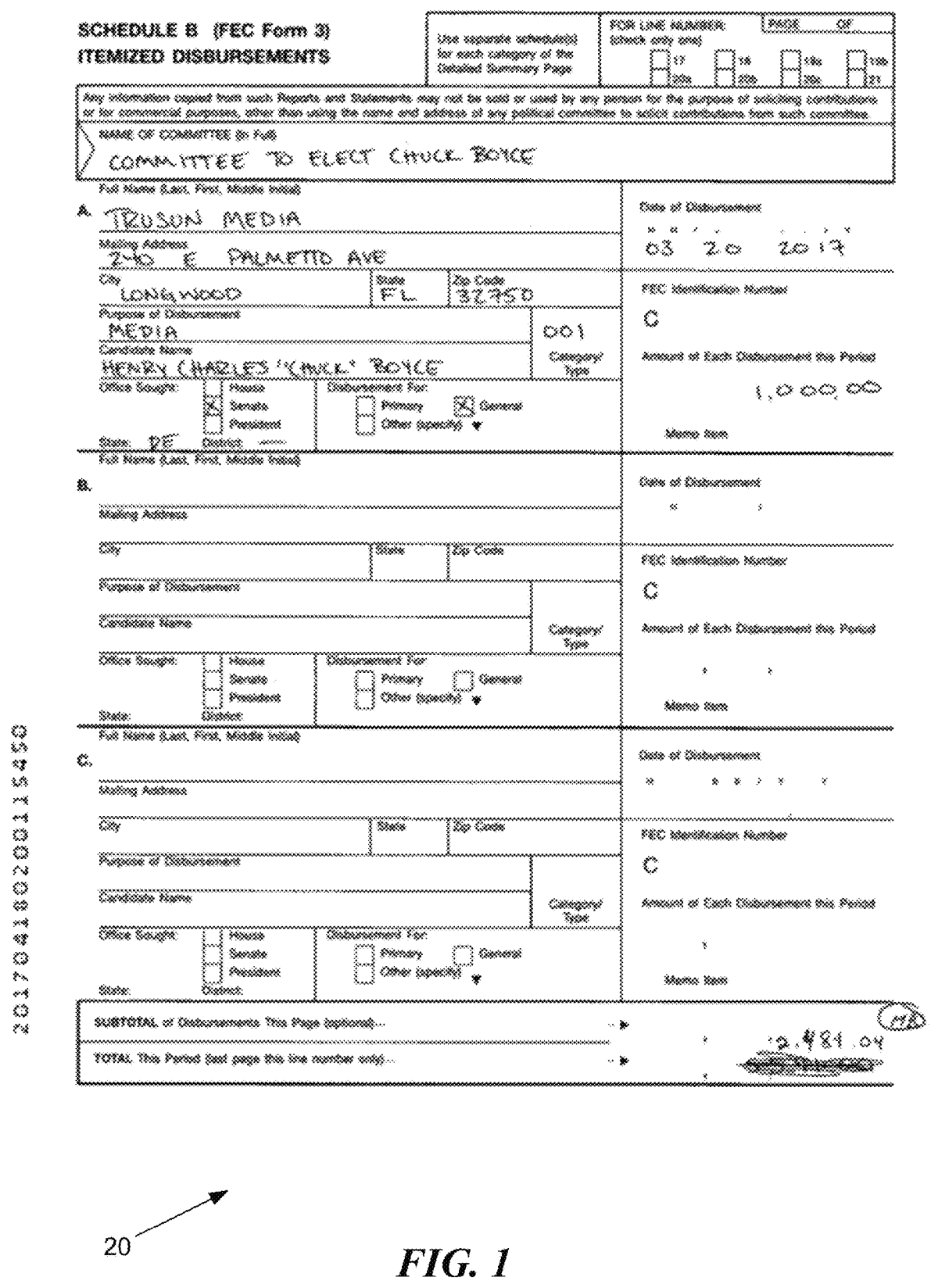

FIG. 1 is an instance 20 of a filled in form. The form displayed here is one provided by the Federal Election Commission to record itemized disbursements. The specific form is provided as an example due to the public nature of the information written thereon. Despite use of the referenced example, the system is able to process any type of form provided. During the process described herein, the instance 20, or portions thereof, are compared to form templates.

FIG. 2 is the correct template 22 that matches the filled in instance 20. Notably, the pictured form template is blank. The correct template 22 is the form template that has all the matching fields of the instance 20. The correct template 22 is the form upon which the instance 20 was filled out.

The correct template 22, and other form templates included herein, include a number of suggested field locations 24 that do not appear on the printed and scanned copy of the instance 20. The suggested field locations 24 are artifacts of a digitized form and do not exist on a printed, physical form.

In some embodiments of the technique disclosed herein, these suggested field locations 24 are not included in the form templates. However, the technique will function with or without the suggested field locations 24. Accuracy is improved when all form templates are consistent concerning the inclusion of digital artifacts such as the suggested field locations 24. One method of removing the suggested field locations 24 is merely to print out the form template and scan. The scanned in version will not include the suggested field locations 26.

FIG. 3 is a sample of assorted form templates 27 available from a single organization. In the given example, the assorted forms 27 are used by the Federal Election Commission. The assorted forms 27 look nothing like the instance form 20 depicted in FIG. 1, or the correct template 22 depicted in FIG. 2. Nevertheless, a computer vision system identifying a particular form conducts a process eliminate these assorted forms 27 from candidacy. While a human reader can intuitively notice differences immediately, a computer system takes different steps to eliminate these forms.

Some organizations have many hundreds or thousands of assorted forms 27. The assorted forms 27 may pertain to very different aspects of the organization and have very different purposes. Performing a precise computer comparison of each of these potentially thousands of assorted forms 27 to the instance 20 is unnecessary. Instead, the majority of the assorted forms 27 are filtered out through a single process that is computationally cheap to perform.

To distinguish between assorted forms 27 and the instance 20, the instance is analyzed by a trained neural network. In some embodiments, the neural network uses a one-shot architecture. In some embodiments, the one-shot neural network architecture is either of an unsupervised or supervised variant. In supervised embodiments, the neural network is supervised during training with indications of correct templates. Similar neural network architectures are used for facial recognition models. Because the instance 20 is an image, it may be compared in a similar manner as a face. A distinction between a facial recognition model and one designed for identifying form templates is in the training configuration. A facial recognition model includes a significant amount of training data of faces where for each identity several examples are provided, whereas the template recognition model is trained to on filled in and blank forms.

When training a template form recognition model there is no specific "face" there is a whole form to compare and any part of the form could be a distinguishing detail. Through a supervised training process, a neural network administrator shows the model correct answers between templates and instances. The model finds the similar key parts of forms itself.

The neural network output is a list (that may be length capped, or threshold capped) of templates that the neural network is most confident match the instance 20. The list of closest matches will not include any of the assorted forms 27 that are clearly distinguishable from the instance 20. Identifying a list of closest matches is a relatively computationally cheap process when compared to a precise analysis that narrows the closest matches down to a single, correct result.

Figure 4:
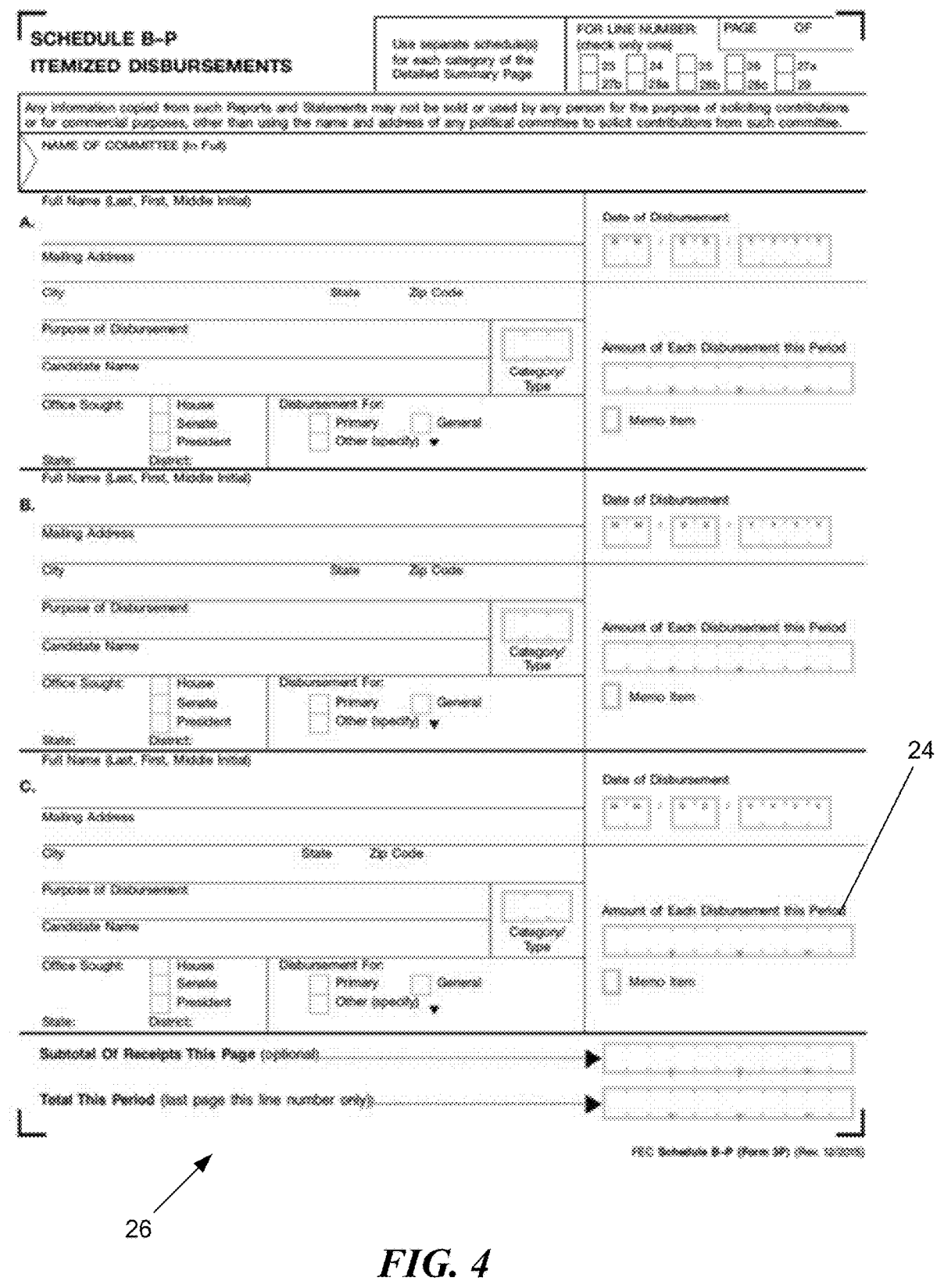

FIG. 4 is an incorrect template 26 of a different version of the form of the filled in instance 20 and would likely be found on the closest matches list. While the incorrect template 26 is not the correct template 22 that is ultimately selected, the incorrect template 26 is meaningfully similar. The incorrect template 26 includes several similar fields and a human would fill in nearly identical information between the form templates 22, 26. However, the incorrect template 26 has fewer fields, and fields in different locations as opposed to the correct template 22. The variations between the incorrect template 26 and the correct template 22 are far less pronounced than the variations present in the assorted forms 27 of FIG. 3. Forms that tend to have less variation tend to be variants versions of the same form (perhaps the differ from year to year).

Distinguishing between the less pronounced variations involves a precise computer vision process. A human can intuitively read the form without having to perform any special analysis. Conversely, when the computer knows how to process instances 20 of a particular type of form, different versions of that form require different processing techniques. The problem is a result of the important information of the form needing to be extracted from different locations on the form based on what variant was used in the instance 20.

For example, take the handwritten data "1,000.00" referring to the "Amount of Each Disbursement this Period" on the instance 20. If the system processes a given instance 20 according to the correct template 22, the system knows what portion of the form to extract in order to obtain the image data including the handwritten $1000. Conversely, if the system processes the instance 20 according to the wrong template 26, the image data extracted instead covers the field title that states "Amount of Each Disbursement the Period" in print. Extracting the image data does not capture the user input.

FIGS. 1 to 4 show a combination of physical and digital forms. Combining the forms is not a requirement. Specifically, FIG. 1 is a scanned version of a physical form including handwriting. While the pictured result is a common occurrence, it is not the only type of occurrence. Some forms are never made physical. In some circumstances, metadata attached to the digitized form may identify the form variant and negate the necessity of the technique taught herein; however, forms are not always identified via metadata. Some digitized forms are poorly organized and do not have identifying metadata. Regardless of the life cycle of a given instance of a form, so long as the pixels making up the image data of the form may be analyzed, the precise technique taught herein is effective.

Figure 5:
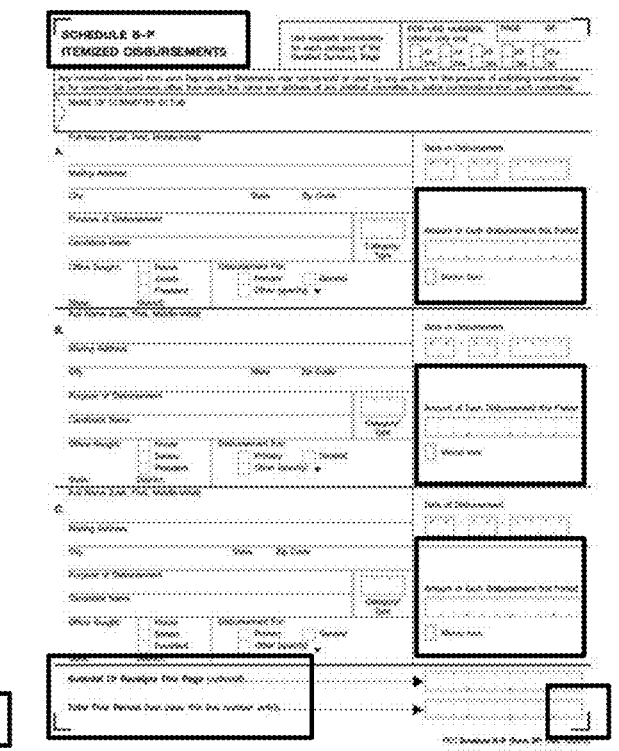
FIG. 5 is a side by side comparison of the correct template and the incorrect template.

FIG. 5 is a side by side comparison of the correct template 22 and the incorrect template 26. For illustrative purposes, certain sections of the correct template 22 and the wrong template 26 have been highlighted. The highlighted sections illustrate some of the distinctions between the two form templates 22, 26. There are actually more distinctions; however, those highlighted are significant enough to illustrate the importance of processing an instance based on the correct form template.

Figure 6:
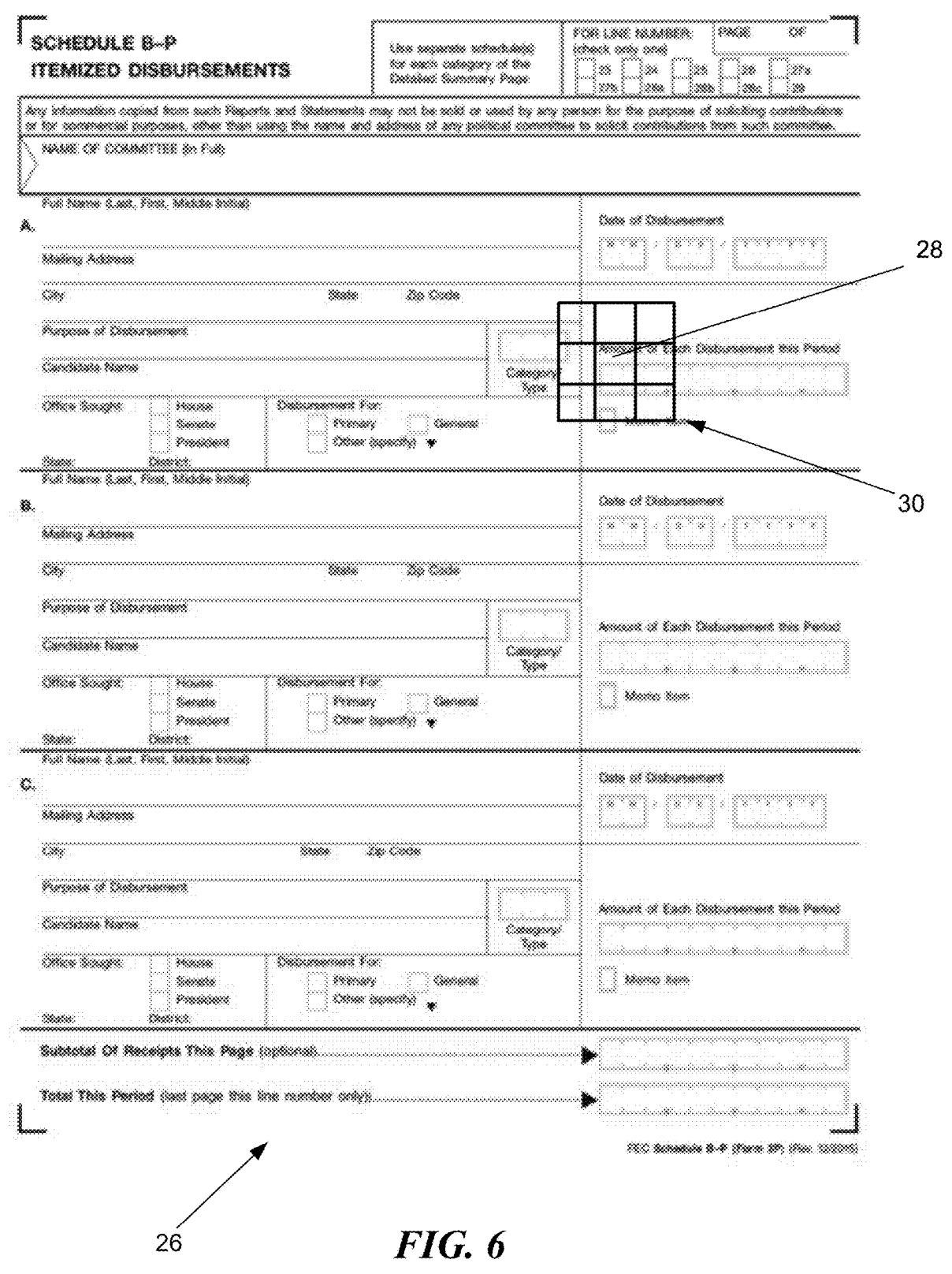

FIG. 6 is an illustration of a key point analysis grid from the incorrect template 26. The process using key points depicted in FIG. 6 is a precise method of identifying a form template from an instance of the form. The key point analysis has a greater computational complexity than neural network analysis. The key point analysis is performed after the neural network analysis has reduced the number of possible templates to a manageable number. FIG. 6 is a simple illustration of what the system does to figure out which form template is the correct one. The figure includes the wrong template 26 and highlights a poorly matching key point 28 or a "bad key point" 28, as well as a grid of pixel patches 30 proximate to the bad key point 28.

To make the ultimate determination of template, the pictured grid and many other grids of pixel patches 30 are compared between the form templates and corresponding pixel patches on the instance 20. The closest match across the comparisons indicates the correct form template.

In order to perform the above, the system determines the bad key points 28 and pixel patches 30 to compare. "Bad" key points are the output of a registration/alignment algorithm. In accordance with embodiments of the disclosed method, the instance 20 is aligned to each of the form templates individually. Some pixels will not match well. These are the bad key points. There are bad key points from both the instance 20 and the form template. The bad key points that are the used are those from the form templates. "bad" key points of the form templates are used because the bad key points from the instance 20 will include the handwriting/user input. The user input will not match well to any of the form templates (each form template is blank).

Even the correct template 22 will have bad key points 28. The cause of bay key points on the correct template 22 is small variations in the registration, printing errors, scanning errors, human error, or any assortment of other possible errors. These are generally nominal errors, and ultimately, the disclosed method identifies between an error and an omission/addition (caused by the incorrect form).

Given one or more bad key points 28, the system extracts a number of pixel patches proximate the bad key points 28. FIG. 5 particularly displays a grid of pixel patches 30. The grid has nine-pixel patches, though other numbers are suitable. Each of the pixel patches is compared to the corresponding pixel patches of the instance 20. The comparison is done a number of times for each bad key point 28 and associated grid of pixel patches 30. The comparison then outputs a matching score. The highest matching score indicates the correct form template.

In the example shown in FIG. 5, the bad key point 28 is a portion of the word "Amount". Comparatively, the same pixels on the instance 20 include a large letter "C" that goes in front of the user's FEC Identification number. Because the word "Amount" does not register well with a big "C", the method will identify a bad key point 28 for the pictured form template.

Further, a comparison of the bad key point 28 and surrounding pixel patches 30 includes numerous inconsistencies. These inconsistencies lead to a poor matching score. The matching score for the comparison combined with the matching score for other bad key points indicate that the form template shown in FIG. 5 is, in fact, the wrong template 26. In contrast, the correct template 22 does not have the same level of inconsistencies.

Figure 7:
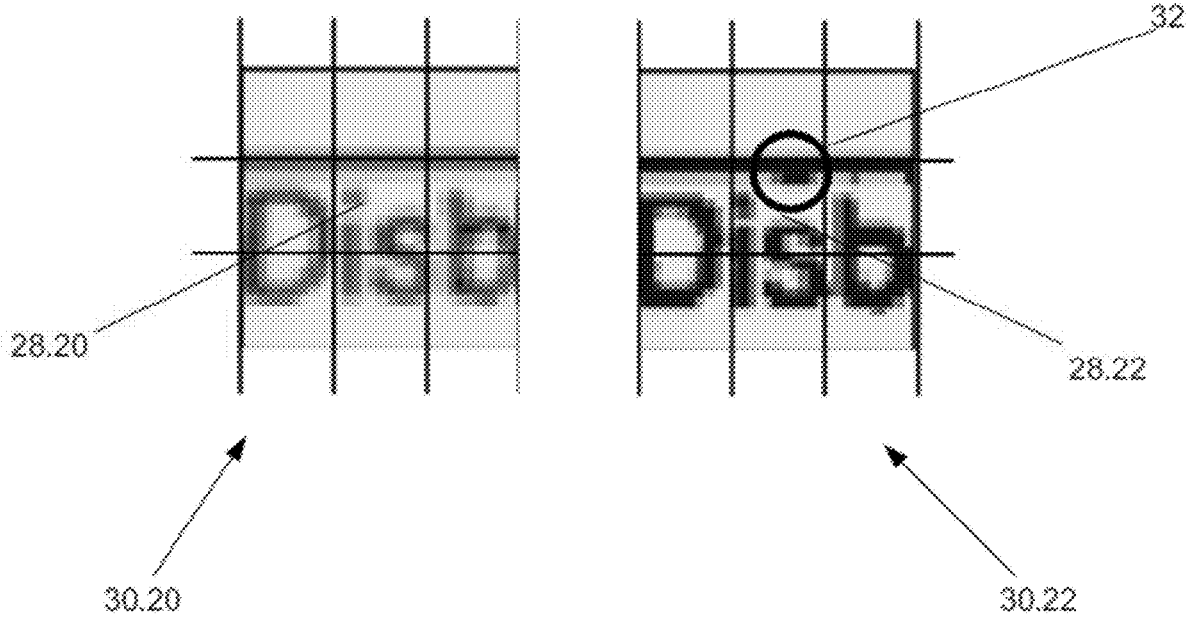
FIG. 7 is an illustration of a matching key point analysis grid.

FIG. 7 is an illustration of a matching key point analysis grid. In practice, the grid of pixel patches 30 drawn on FIG. 5 is larger than ideal. The size is for illustrative purposes. Using a smaller grid helps avoid handwriting/user input. If a pixel patch catches handwriting, the comparison for that pixel patch is thrown off. The grids displayed in FIG. 6 are 32×32 pixels. 32 pixels does not divide evenly into 3 patches. It is unnecessary for a given pixel patch to include complete pixels, or that a given pixel patch has a uniform size.

The left grid of pixel patches 30.20 is from the instance 20, and the right grid of pixel patches 30.22 is from the correct template 22. The bad key point 28.22 is the first four letters of the word "Disbursement" and could be from a number of locations on the correct template 22 (e.g., look at the bottom right of the A., B., and C. blocks).

The bad key point 28.22 was identified in the registration process based on a few erroneous pixels 32. There are many causes for why the erroneous pixels 32 are there. However, on analysis of the remaining eight-pixel patches, there is a strong matching correlation. As a result, bad key point 28.22 is categorized as an error/noise as opposed to a distinction between forms.

Figure 8:
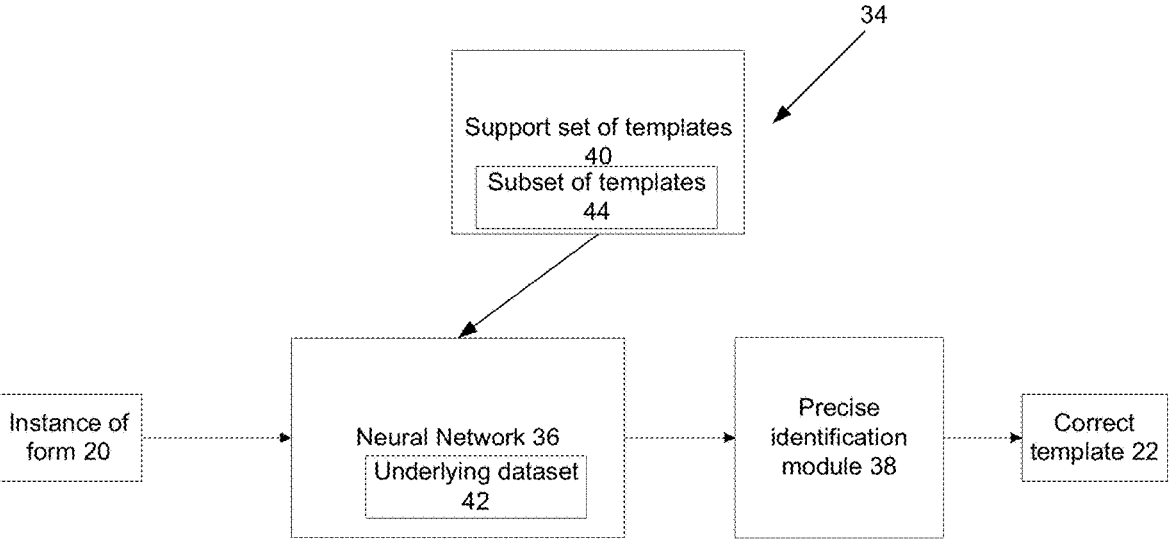
FIG. 8 is a block diagram illustrating a scaling template matching system.

FIG. 8 is a block diagram illustrating a scaling template matching system 34. The scaling template matching system 34 includes a neural network 36 and a precise identification module 38.

The neural network 36 is trained through one-shot learning. One-shot learning includes populating the training data with only one example of each template 40. Unlike a face recognition model, where the model would include multiple images of the same face from different angles and in different light, the form recognition model 36 includes a single example per form template. Training the form recognition model with a large number of hand writing samples specific to a relevant organization from which the filled-in instance comes from is a prohibitively expensive process (that would have to be repeated each time a new organization made queries) and excessive for the purposes of filtering out clearly incorrect templates. Further, sufficient examples may not exist to providing an underlying dataset 42 to the neural network 36 properly.

One-shot training in a traditional convolutional neural network ("CNN") makes use of an underlying dataset 42 that is significantly smaller than the data sets traditionally used for machine learning or AI. For example, if a given organization has 3281 total form variants, then the underlying dataset 42 merely includes a single image of each of those 3281 forms. Traditional CNN tend to use tens or hundreds of thousands of examples (or more!). Input to a traditional CNN is merely the instance of the form 20 (e.g., does not further include support set 40). In the traditional CNN embodiment, the underlying dataset 42 is the support set 40. That is, whatever template images would be included in the support set 40 are instead included in the underlying data set 42.

In some embodiments, a few-shot relation network is used where the "training" occurs with the submission of the query. A few-shot model is any model that is structured to make use of a support set, where an underlying dataset trains the model how to "think," but output for individual queries are based on the support set (as opposed to the underlying data set). A few-shot relation network uses makes use of few-shot inputs. Few-shot inputs include a query and a small support set.

The use of the term few-shot is a misnomer in this case because while the architecture and process are that of a few-shot model, many hundreds or thousands of support set examples are submitted (thus, the support set would not strictly be a "few-shot"). During the training process, the inputs per iteration are 1) the query image 2) the query image support-set (all the templates from the relevant organization) and 3) the label for each support-set template image (0 if the sheet does not belong to the query and 1 otherwise). The output is the similarity score between the query and each of the support-set images.

One-shot learning may be implemented in both a few-shot and a traditional CNN architecture. One-shot learning refers to the specific content of the data used to train the model, whereas few-shot and traditional CNN refer to model architectures.

Despite the training process operating on the premise of a one-shot learning paradigm, in some embodiments, the neural network 36 includes an underlying dataset 42 that may include multiple examples of a given template to teach the neural network 36 how to respond to training. For example, an underlying dataset 42 may include approximately 50,000 pages from over a hundred different organizations. The dataset manually labels the correct template given a query instance. In some embodiments, the underlying dataset 42 includes form templates that are mutually exclusive from the set of templates 40 used for training (one-shot learning). Thus, the templates forming the underlying basis for showing the neural network 36 what a form is look different than the templates used for training.

In the embodiment of a few-shot that uses a support set that is not a few-shot (e.g., thousands of support set examples) it is a challenge to store thousands of templates in Graphics Processing Unit (GPU) memory simultaneously. At the time of this filing, off-the-shelf hardware is not able to manipulate sets of templates 40 in the thousands of templates. While in the future, hardware may advance to a point where GPU memory is sufficient without modification, some computational modifications enable present hardware to manipulate large support sets.

In some embodiments, the computational modifications involve employing parallelism and multiple GPUs to the support set of templates 40. A set of workers (executing on respective GPUs) each obtain a random subset 44 of the support set of templates 40 and the instance 20. Across all workers, the entire set of templates 40 is represented. Each worker then performs the neural network analysis on the instance 20 as compared to that worker's respective subset 44 of the support set of templates 40. Output of the workers' neural network 36 is synchronized back into another layer (e.g., the best results from first layer advance to a second layer for subsequent submission to the neural network 36 with the instance 20) with the instance 20 to get a final score. Additionally, in some embodiments, the support set of templates is stored into GPU memory using an FP16 approach. FP16 uses half precision for computation; thus, the GPU memory is enabled to store more images simultaneously.

An example neural network 36 architecture that is suitable is the ResNet50 architecture. ResNet50 has four residual bottleneck layers where each layer utilizes 3, 4, 6 and 3 residual connections respectively. For rough form template sorting, use of the first two bottleneck layers alone is suitable. In some embodiments, the ResNet50 architecture is configured with 32 feature maps in the first layer and 64 feature maps for the second layer.

The neural network 36 output is a list (that may be length capped, or threshold capped) of templates that the neural network 36 is most confident match the instance. If multiple examples of the same template included in the training, then the output may be biased toward a specific template. Because the neural network 36 is configured to identify templates that are close, not the exact template, biasing toward one specific template is counter-productive. Further, neural networks that operate with smaller models require less processing time to process output.

In order to generate output, the neural network 36 may simplify the instance 20 and the set of templates 40. In some embodiments, the neural network 36 simplifies the image data of the instance 20 and the set of templates 40 into vectors that include data representative of the corresponding images (a query vector and support set vectors respectively). Scoring the query vector against each of the set of support vectors via the neural network provides for a computationally efficient process using important features of images.

Vectors can be compared in the same manner images can be compared, but vector approximations of images are less data dense than the corresponding image files of forms. In some embodiments, the query vector is concatenated with each support set vectors and a pairwise comparison relation network is applied to compare the two ends of the concatenated vector. The less data dense vectors have fewer dimensions for the neural network 36 to consider. Because the output of the neural network 36 does not have to be perfect, vector approximations of the instance 20 and the set of templates 40 used to train the neural network 36 reduce the processing expense of the neural network 36 at a negligible cost to the usefulness of the output.

The output of the neural network 26 is delivered to the precise identification module 38. The technique used by the precise identification module 38 may vary. However, one example for the precise identification module 38 is described in the text associated with FIGS. 4-7 and 10. In some embodiments the precise identification module 38 registers the instance to each of the closest matches output by the neural network 36 and compares pixels between the documents. The precise identification module 38 uses a technique that is more computationally complex than the neural network 36. The precise identification module 38 identifies the correct template 22 from the list of closest templates output by the neural network 36.

The process of identifying the correct template 22 from the instance 20 includes two primary operations. The first operation is performed by the neural network 36 and the second operation is performed by the precise identification module 38.

Figure 9:
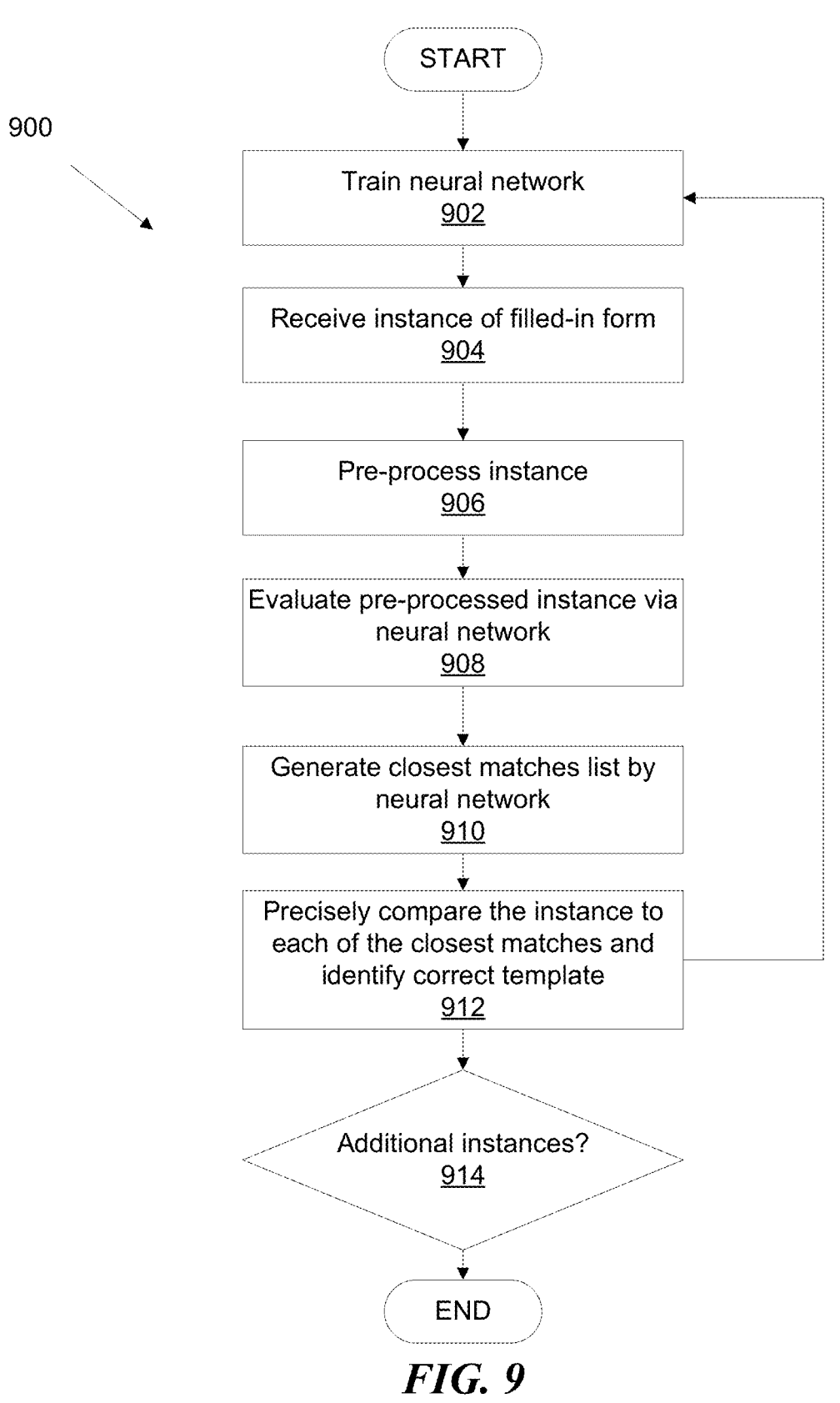
FIG. 9 is a flowchart illustrating a scaling template matching method.

FIG. 9 is a flowchart illustrating a scaling template matching method. In step 902, a neural network is trained with a set of templates of forms for a given organization. One example of each form is used in the set of templates. If multiple examples of each form are used, then a final output of the neural network may include multiple instances of the same template rather than a set of closest templates and introduce errors into precise comparisons.

In step 904, the scalable form matching system receives an instance of a filled-in form. The instance includes user responses to the prompts contained in the form. In step 906, the instance is pre-processed. The pre-processing step may include a number of simple operations to reduce overall system error. Examples of simple operations include deleting the instance and ending starting over if the instance is a blank document. In some embodiments, the pre-processing identifies that the instance is a blank template with no user responses and similarly drops the instance. Another example of a preprocessing step is large scale rotation. Large scale rotation refers to rotation in chunks of ninety degrees (0, 90, 180, or 270) that orient the instance upright. While the instance may be skewed by a different angle, precise correction at other rotations slows down the process. Accordingly, only rotations to "cardinal directions" in 90-degree chunks is performed. The amount of rotation may be determined at least by optical character reading software.

In step 908, the pre-processed instance is evaluated by the trained neural network. In step 910, a set of closest matches between the instance and the set of templates used to train the neural network is identified. The size of the set of closest matches may be determined by a pre-determined, fixed number, or by all those templates that the neural network assigns a threshold match confidence to. In step 912, the set of closest matches is compared to the instance via a precise comparison technique. Examples of precise comparison techniques include pixel-by-pixel registration followed by an evaluation of the match quality of the registration. In step 914, the scaling form matching system identifies whether additional filled-in instances remain. Where there are more instances to match form templates to, the method begins anew at step 904. Where there are no more instances to match, the method ends. Each iteration of the method may be parallelized to reduce processing time.

Figure 10:
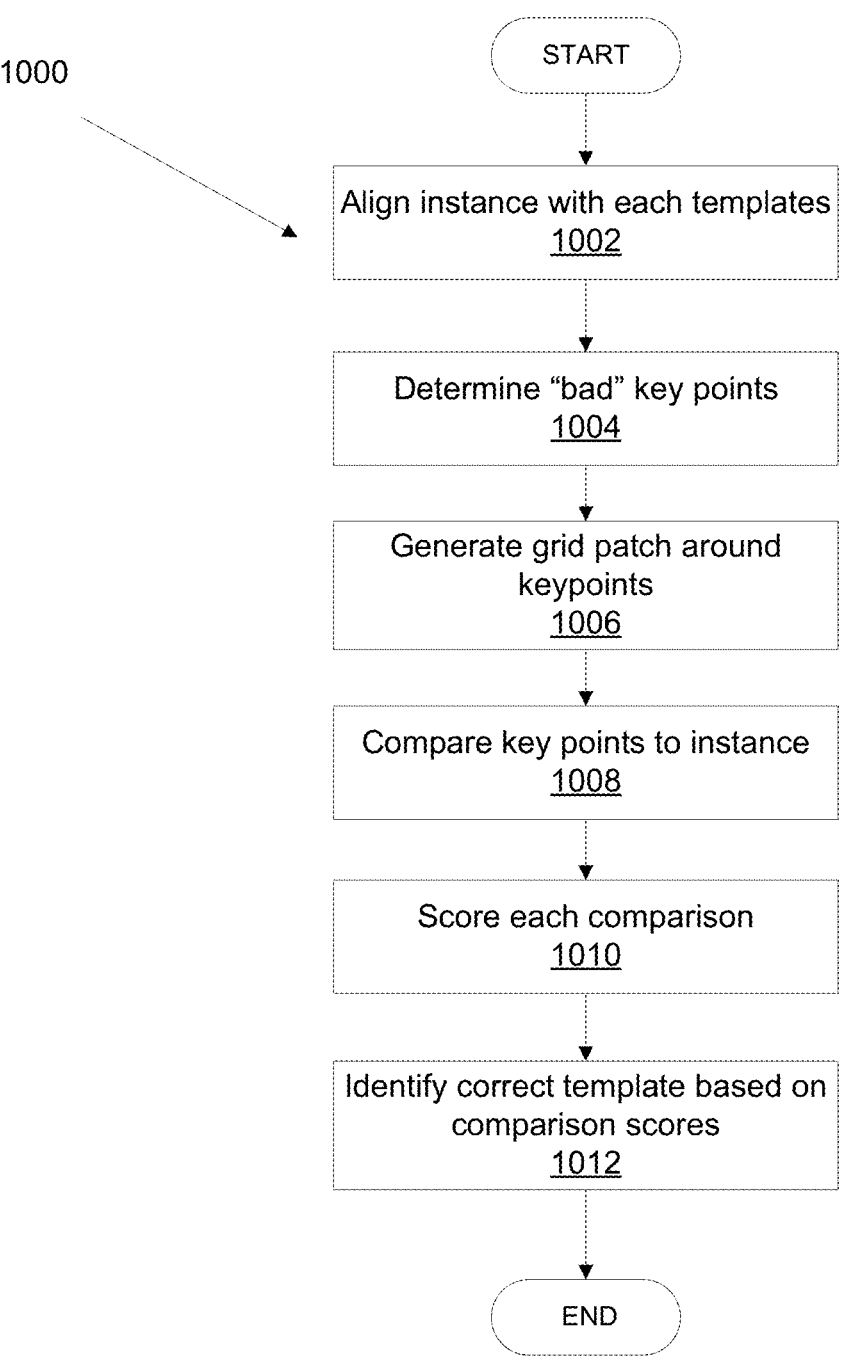
FIG. 10 is a flowchart illustrating a method of determining which version of a form a particular instance is.

FIG. 10 is a flowchart illustrating a precise comparison method of determining which version of a form a particular instance is. In step 1002, an instance of a form is aligned/registered with each form template. The alignment is performed individually for each form template and there is a different result for each. There are a number of registration techniques that are suitable. In some embodiments, based on a threshold of movement in the alignment/registration process, alignment may be performed twice on a given instance/template pairing. For example, where an instance is rotated more than 90 degrees in order to align, the alignment may be performed a second time on the once-aligned instance. The registration process used outputs key points that did not register well as a byproduct. An example of such a registration process is available via OpenCV. OpenCV is a public library available through Opencv.org. A capture on Dec. 2, 2017 of OpenCV is available through the Internet Archive at https://web.archive.org/web/20171202174943/https://opencv.org/. Specifically, OpenCv has a function called SURF key points that provides the bad key points.

In step 1004, the system determines the bad key points to use. As noted in step 1002, the registration technique outputs the requisite bad key points. The bad key points used in subsequent steps are from the registration of the form template as opposed to the instance. Points from the template are carried forward because the bad key points from the instance will include the handwriting/user input. The user input will not match well to any of the form templates (each form template is blank).

The purpose of the process is to determine which form template is correct. If the handwriting does not register well to any of the form templates, it is not as useful to determining the correct form template. The above is not to say that the bad key points from the instance are never useful. A comparison using bad key points from the instance can still be made.

In step 1006, the system extracts pixels proximate to the bad key point from both the form template, and the instance registered to the form template. The pixels can take a number of shapes and be subdivided a number of ways. Pictured in FIGS. 5 and 6 are 3×3 grids. In other embodiments, other shapes, such as circles or triangles, could be used for both individual cells and/or the entire set of analyzed pixels. A set of pixels that include the bad key point, and adjacent pixels are used. The set of pixels may be subdivided into cells and there may be multiple layers of adjacency to the bad key point, or a single layer. There may be incomplete layers of adjacency (e.g., the bad key point plus a cell to the left side, and no other cells).

In step 1008, the set of pixels from the form template are compared to the corresponding pixels of the instance registered to the form template. Like the method of registration/alignment, the method of comparison may vary. A goal of the process is to determine how well each cell matches its corresponding cell. An example method of comparison uses a histogram of oriented gradients (HOG). Pixels from each cell are compared and a Euclidean distance between the cells provides a match score.

In step 1010, the individual form templates match scores are determined. Because there are multiple bad key points that are individually analyzed, there is an overall form template match score. The overall form template match score is based on a combination the individual match scores from each of the pixel patches. In some embodiments, the individual patches are blurred before a comparison technique is used. The comparison technique can be taken a number of ways. Examples of overall match score techniques include averages, summations, averages while discarding outliers, and averages of select bad key points having the poorest individual match scores. In step 1012, the correct form template is chosen. The correct template is the form template having the best overall match score with its respective registered instance.

Figure 11:
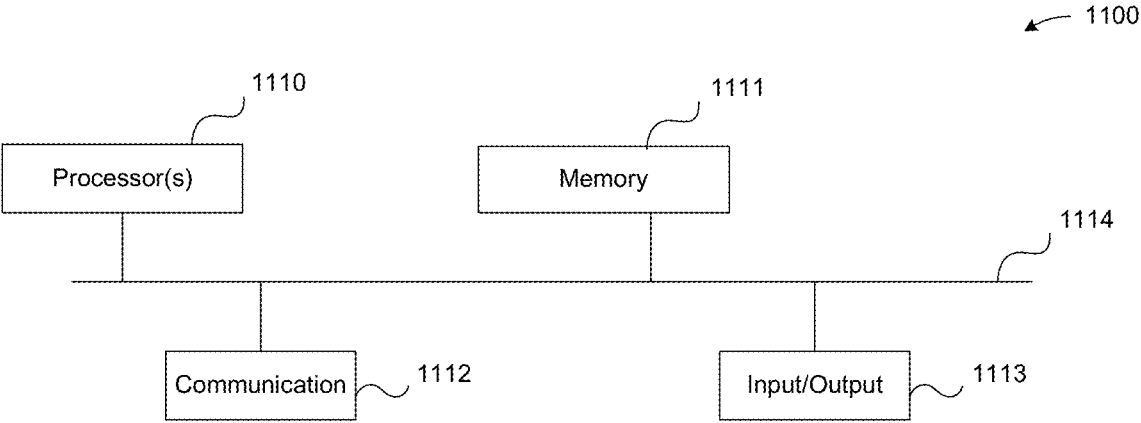
FIG. 11 is a high-level block diagram showing an example of a processing device.

FIG. 11 is a high-level block diagram showing an example of a processing device 1100 that can represent a system to run any of the methods/algorithms described above. A system may include two or more processing devices such as represented in FIG. 11, which may be coupled to each other via a network or multiple networks. A network can be referred to as a communication network.

In the illustrated embodiment, the processing device 1100 includes one or more processors 1110, memory 1111, a communication device 1112, and one or more input/output (I/O) devices 1113, all coupled to each other through an interconnect 1114. The interconnect 1114 may be or include one or more conductive traces, buses, point-to-point connections, controllers, scanners, adapters and/or other conventional connection devices. Each processor 1110 may be or include, for example, one or more general-purpose programmable microprocessors or microprocessor cores, microcontrollers, application specific integrated circuits (ASICs), programmable gate arrays, or the like, or a combination of such devices. The processor(s) 1110 control the overall operation of the processing device 1100. Memory 1111 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1111 may store data and instructions that configure the processor(s) 1110 to execute operations in accordance with the techniques described above. The communication device 1112 may be or include, for example, an Ethernet adapter, cable modem, Wi-Fi adapter, cellular transceiver, Bluetooth transceiver, or the like, or a combination thereof. Depending on the specific nature and purpose of the processing device 1100, the I/O devices 1113 can include devices such as a display (which may be a touch screen display), audio speaker, keyboard, mouse or another pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 1000 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with one another, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method of identifying a form template from a set of templates that a filled-in instance of a form corresponds to comprising:

executing a first operation via a recognition neural network trained on one copy of each of the set of templates that identifies a subset of the set of templates that most closely corresponds to the filled-in instance of the form;

executing a second operation via a registration process that identifies a best match of the subset of the set of templates and the filled-in instance of the form, wherein the second operation is more computationally complex than the first operation; and sorting the filled-in instance of the form with forms corresponding to the best match of the subset of the set of templates, wherein said executing the first operation further comprises: generating a set of template vectors describing graphical dimensions of each of the set of templates; generating a query vector describing graphical dimensions of the filled-in instance of the form; and scoring the query vector against each of the set of template vectors via the recognition neural network.

2. The method of claim 1, wherein the filled-in instance of the form is a member of a set of filled-in forms, the method further comprising:

filtering out blank images within the set of filled-in forms.

3. The method of claim 2, further comprising:

orienting the set of filled-in forms right-side up via rotating each of the set of filled-in forms by 0, 90, 180, or 270 degrees, and no other amounts.

4. The method of claim 1, wherein the subset of the set of templates comprises a predetermined number of closest matches.

5. The method of claim 1, wherein the subset of the set of templates comprises each of the set of templates that exceed a threshold matching score with the filled-in instance of the form.

6. The method of claim 1, wherein the recognition neural network is architecturally configured as a facial recognition neural network.

7. A system comprising:

a memory that stores a set of template forms;

a processor configured to associate a filled-in instance of a form with a specific form template of the set of template forms based on instructions stored in the memory, the instructions when executed cause the processor to:

execute a first operation via a recognition neural network trained on one copy of each of the set of template forms that identifies a subset of the set of template forms that most closely corresponds to the filled-in instance of the form; and execute a second operation via a registration process that identifies a best match of the subset of the set of template forms and the filled-in instance of the form, wherein the second operation is more computationally complex than the first operation, wherein the memory further includes instructions that cause said execution of the first operation to further comprise: generate a set of template vectors describing graphical dimensions of each of the set of template forms; generate a query vector describing graphical dimensions of the filled-in instance of the form; and score the query vector against each of the set of template vectors via the recognition neural network.

8. The system of claim 7, wherein the filled-in instance of the form is a member of a set of filled-in forms, the processor further configured to:

filter out blank images within the set of filled-in forms.

9. The system of claim 8, the processor further configured to orient the set of filled-in forms right-side up via rotating each of the set of filled-in forms by 0, 90, 180, or 270 degrees, and no other amounts.

10. The system of claim 7, wherein the subset of the set of template forms comprises a predetermined number of closest matches.

11. The system of claim 7, wherein the subset of the set of template forms comprises each of the set of template forms that exceed a threshold matching score with the filled-in instance of the form.

12. The system of claim 7, wherein the recognition neural network is architecturally configured as a facial recognition neural network.

* * * * *